United States Patent
Kondo et al.

(10) Patent No.: US 12,240,489 B2
(45) Date of Patent: Mar. 4, 2025

(54) INFORMATION MANAGEMENT SYSTEM, INFORMATION MANAGEMENT APPARATUS, AND INFORMATION MANAGEMENT METHOD

(71) Applicant: HITACHI, LTD., Tokyo (JP)

(72) Inventors: Akihiro Kondo, Tokyo (JP); Takashi Matsumoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 216 days.

(21) Appl. No.: 17/922,856

(22) PCT Filed: Feb. 12, 2021

(86) PCT No.: PCT/JP2021/005208
§ 371 (c)(1),
(2) Date: Nov. 2, 2022

(87) PCT Pub. No.: WO2021/261004
PCT Pub. Date: Dec. 30, 2021

(65) Prior Publication Data
US 2023/0347928 A1    Nov. 2, 2023

(30) Foreign Application Priority Data
Jun. 25, 2020 (JP) .................... 2020-109240

(51) Int. Cl.
*B60W 60/00* (2020.01)
*B60W 40/02* (2006.01)

(52) U.S. Cl.
CPC .......... *B60W 60/001* (2020.02); *B60W 40/02* (2013.01); *B60W 2552/53* (2020.02);
(Continued)

(58) Field of Classification Search
CPC ............... B60W 60/001; B60W 40/02; B60W 2554/20; B60W 2552/53; B60W 2556/40
See application file for complete search history.

(56) References Cited

U.S. PATENT DOCUMENTS

| 2019/0096237 A1 | 3/2019 | Nishimura et al. |
| 2019/0317499 A1 | 10/2019 | Imai et al. |

(Continued)

FOREIGN PATENT DOCUMENTS

| CN | 109559503 A | 4/2019 |
| CN | 109641591 A | 4/2019 |

(Continued)

OTHER PUBLICATIONS

Chinese Office Action received in corresponding Chinese Application No. 202180033059.9 dated Dec. 5, 2023.
(Continued)

*Primary Examiner* — Huan Le
(74) *Attorney, Agent, or Firm* — MATTINGLY & MALUR, PC

(57) ABSTRACT

An information management system includes: a first storage unit configured to store road information in which first information acquired by a first sensor and indicating that there is no stationary object on a road and second information acquired by a second sensor and indicating that there is a stationary object on the road are associated with each other; a second storage unit configured to store, for each of types of moving objects configured to move on the road, passage possibility information related to possibility of passage on the road; and a determination unit configured to determine, for each of the types, whether the road is usable for passage based on the road information and the passage possibility information.

6 Claims, 10 Drawing Sheets

(52) U.S. Cl.
CPC ..... *B60W 2554/20* (2020.02); *B60W 2554/40* (2020.02); *B60W 2556/40* (2020.02)

(56) References Cited

U.S. PATENT DOCUMENTS

2020/0012279 A1   1/2020  Nagata et al.
2020/0166951 A1*  5/2020  Choi ............... B60W 60/00184

FOREIGN PATENT DOCUMENTS

| JP | 2017-208040 A | 11/2017 |
| JP | 2019-109675 A | 7/2019 |
| WO | 2018/143238 A1 | 8/2018 |

OTHER PUBLICATIONS

International Search Report of PCT/JP2021/005208 dated Apr. 13, 2021.

* cited by examiner

[FIG. 1]
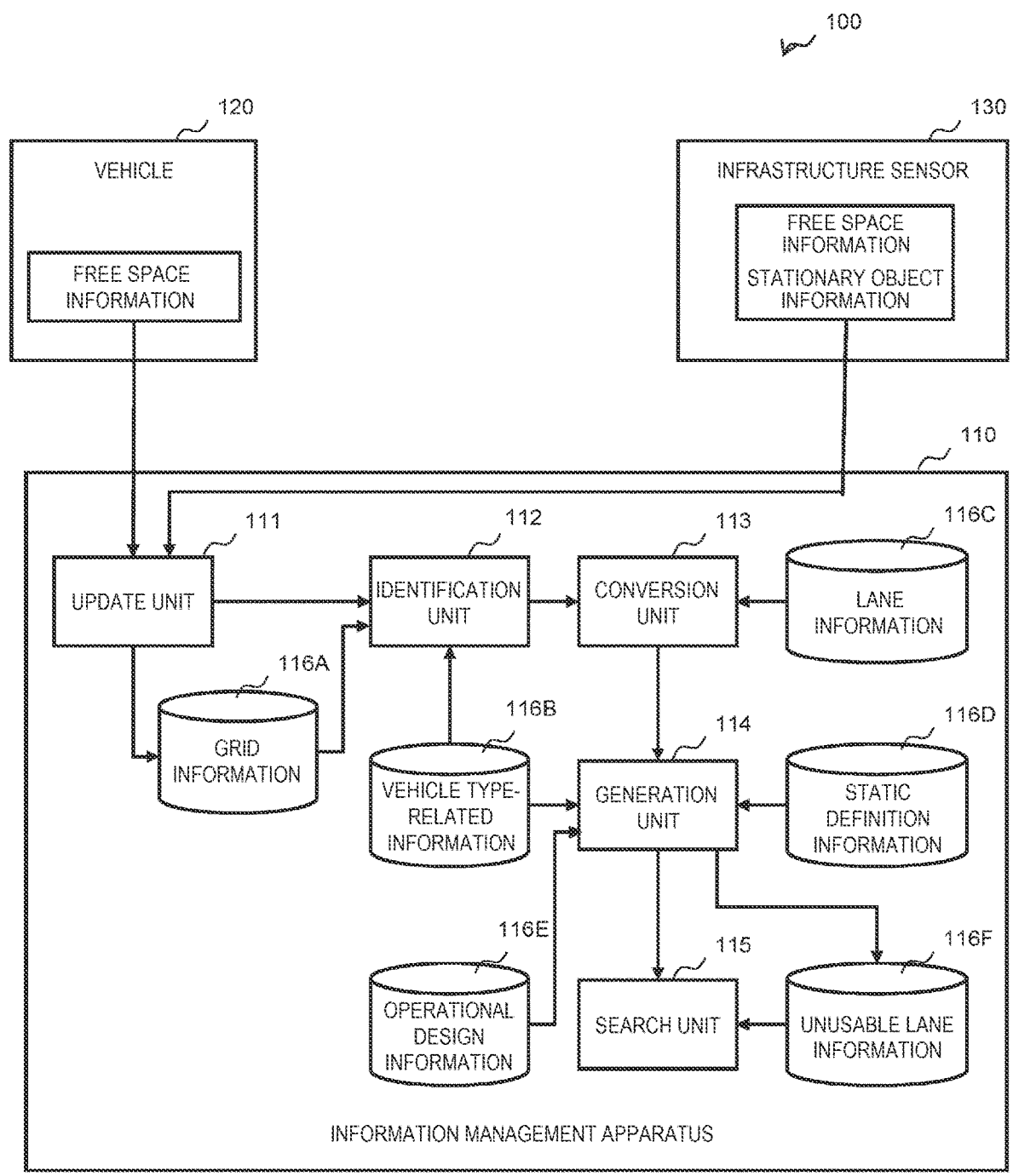

[FIG. 2]
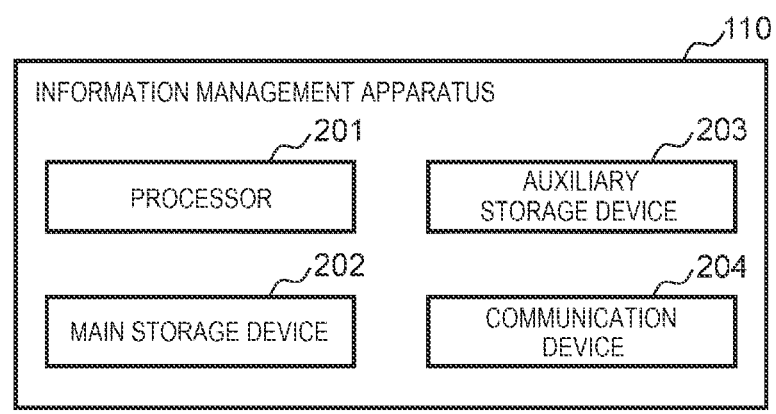

[FIG. 3]
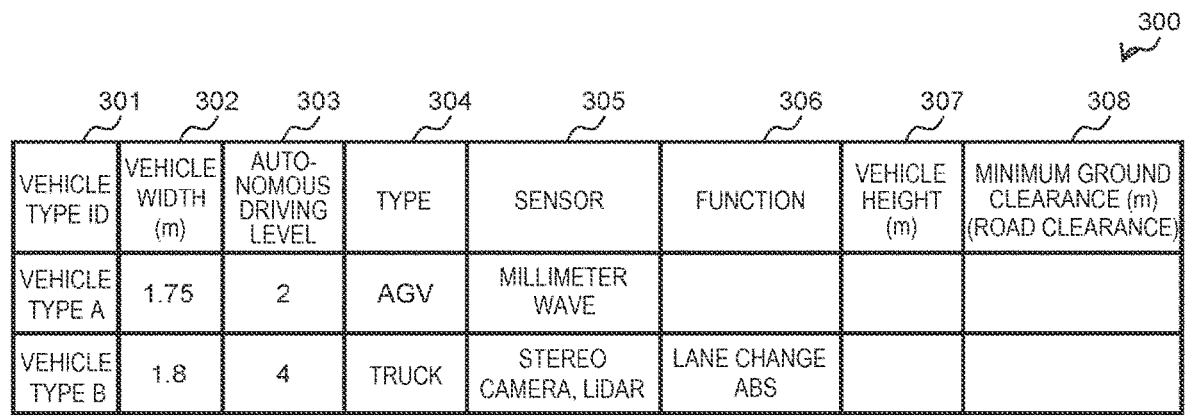
| VEHICLE TYPE ID | VEHICLE WIDTH (m) | AUTO-NOMOUS DRIVING LEVEL | TYPE | SENSOR | FUNCTION | VEHICLE HEIGHT (m) | MINIMUM GROUND CLEARANCE (m) (ROAD CLEARANCE) |
|---|---|---|---|---|---|---|---|
| VEHICLE TYPE A | 1.75 | 2 | AGV | MILLIMETER WAVE | | | |
| VEHICLE TYPE B | 1.8 | 4 | TRUCK | STEREO CAMERA, LiDAR | LANE CHANGE ABS | | |
[FIG. 4]
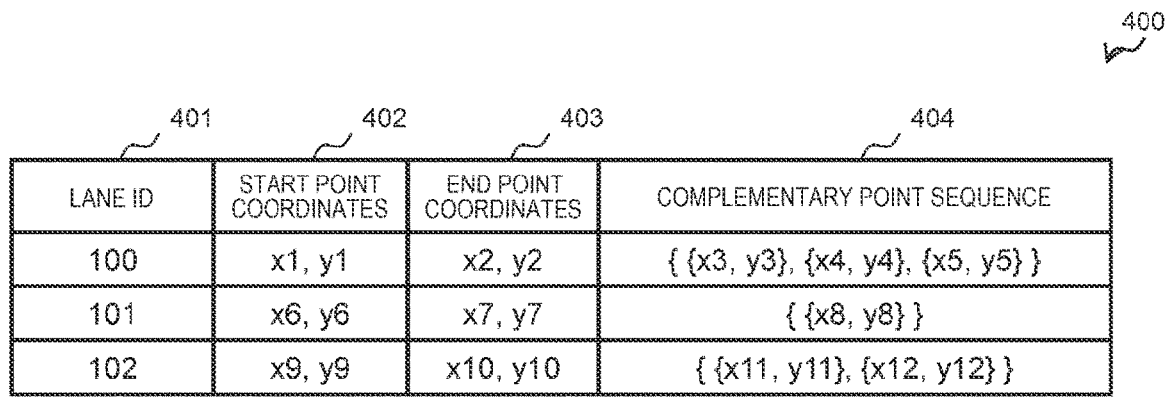
| LANE ID | START POINT COORDINATES | END POINT COORDINATES | COMPLEMENTARY POINT SEQUENCE |
|---|---|---|---|
| 100 | x1, y1 | x2, y2 | { {x3, y3}, {x4, y4}, {x5, y5} } |
| 101 | x6, y6 | x7, y7 | { {x8, y8} } |
| 102 | x9, y9 | x10, y10 | { {x11, y11}, {x12, y12} } |

[FIG. 5]

| LANE ID | INFRASTRUCTURE SENSOR-CORRESPONDING ROAD | SPEED LIMIT (km/h) | UNMANAGED VEHICLE PRESENCE OR ABSENCE | REQUIRED AUTONOMOUS DRIVING LEVEL | PASSABLE TIME ZONE | PEDESTRIAN PRESENCE OR ABSENCE |
|---|---|---|---|---|---|---|
| 100 | TRUE | 30 | TRUE | 4 | 8:00-17:00 | TRUE |
| 101 | FALSE | 20 | TRUE | 2 | 8:00-17:00 | TRUE |
| 102 | FALSE | 20 | FALSE | 2 | 8:00-12:00 | FALSE |

| VEHICLE TYPE ID | INFRASTRUCTURE SENSOR-CORRESPONDING ROAD | UNMANAGED VEHICLE-PRESENT ROAD | PEDESTRIAN-PRESENT ROAD |
|---|---|---|---|
| VEHICLE TYPE A | REQUIRED | NOT ALLOWED | NOT ALLOWED |
| VEHICLE TYPE B | NOT REQUIRED | ALLOWED | ALLOWED |

601 602 603 604

[FIG. 7]
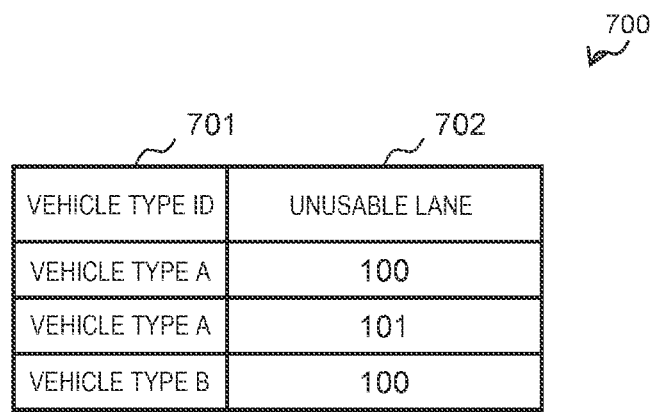
[FIG. 8]
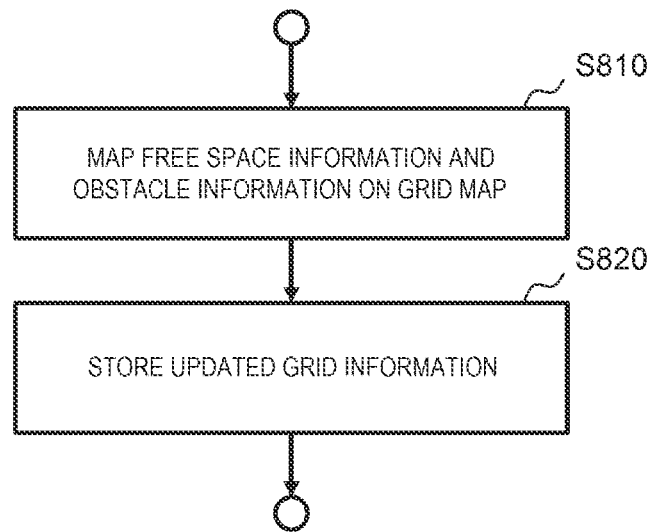

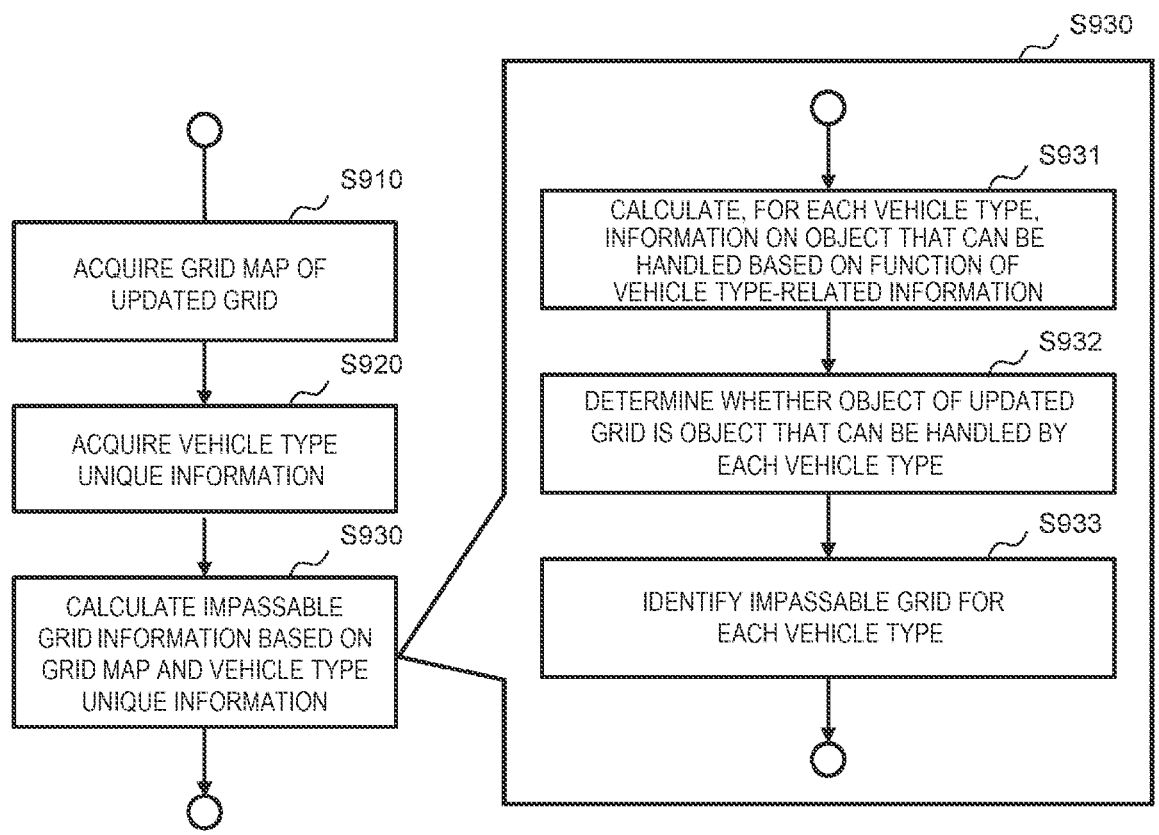

[FIG. 10]
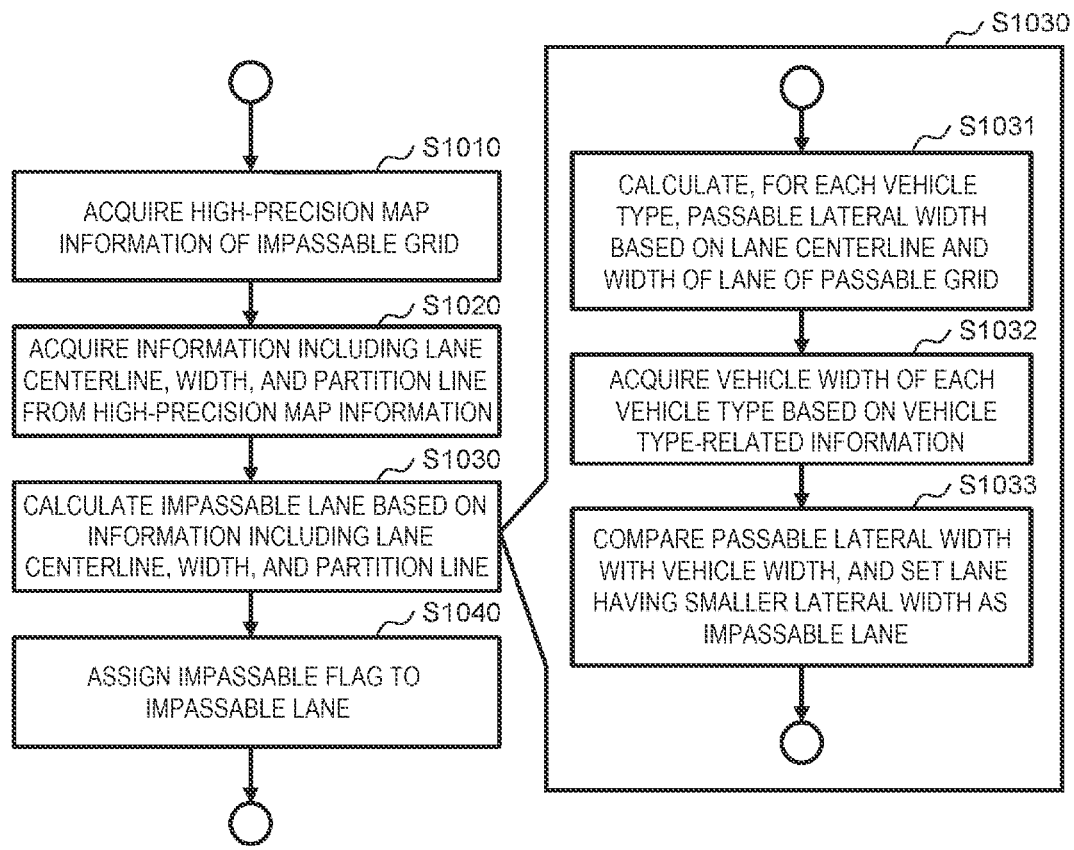
[FIG. 11]
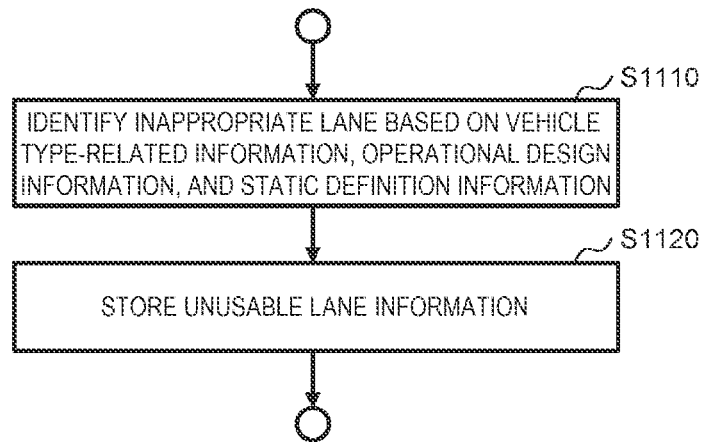

[FIG. 12]
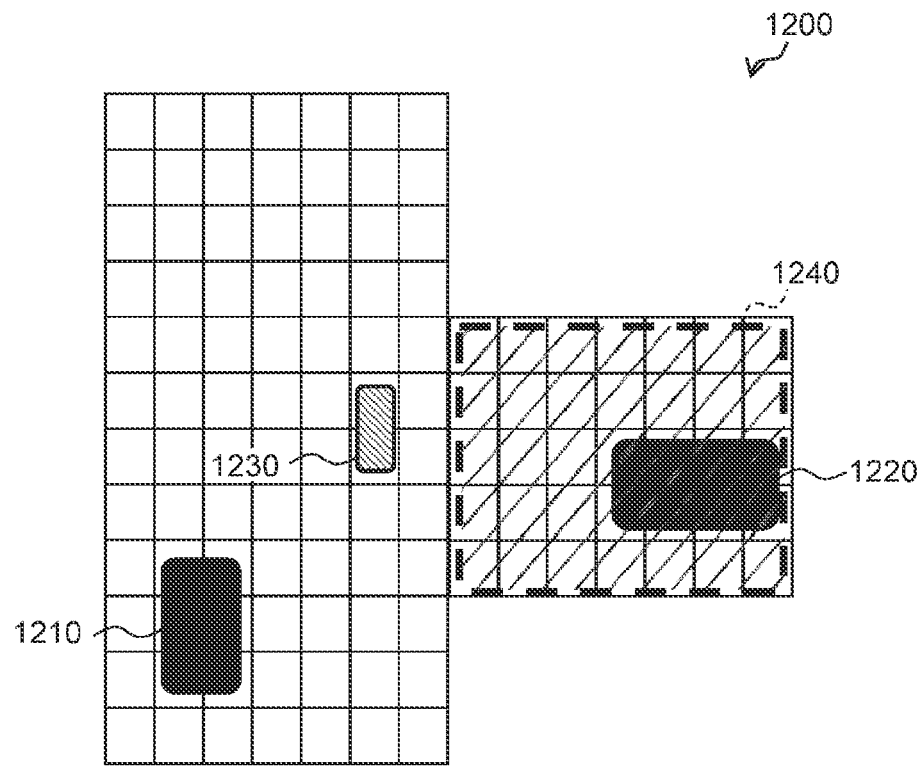
[FIG. 13]
| CAPABILITY OF VEHICLE TYPE | OBJECT THAT CAN BE HANDLED |
|---|---|
| LANE CHANGE | POTHOLE, FALLING OBJECT, ··· |
| DENSE FOG COUNTERMEASURE | FOG |
| ABS | ROAD SURFACE FROZEN |
| ROAD CLEARANCE | STEP HEIGHT |

[FIG. 14]
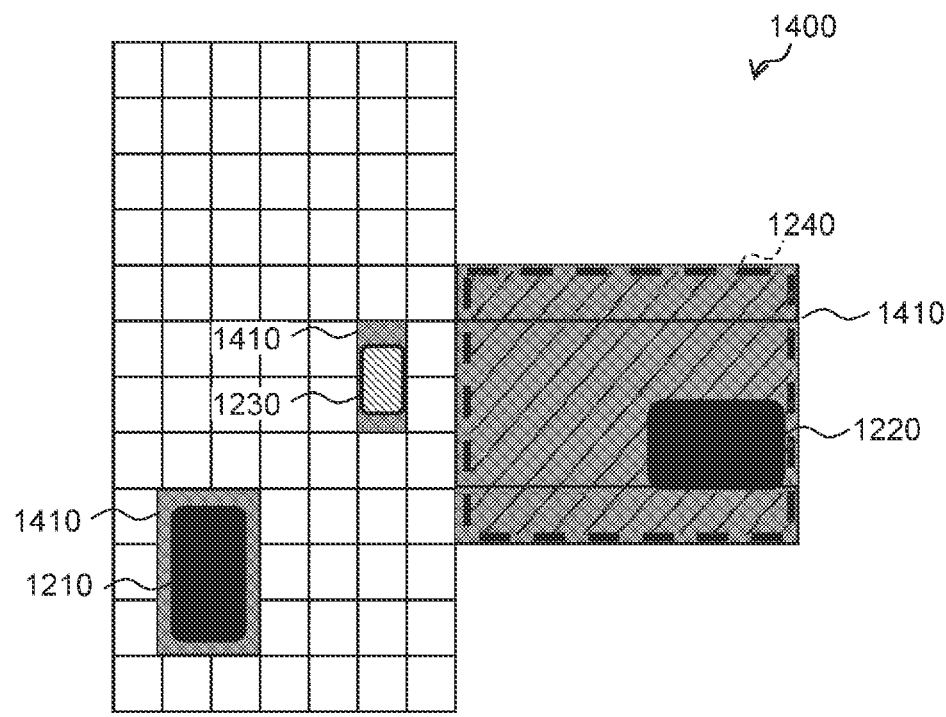
[FIG. 15]
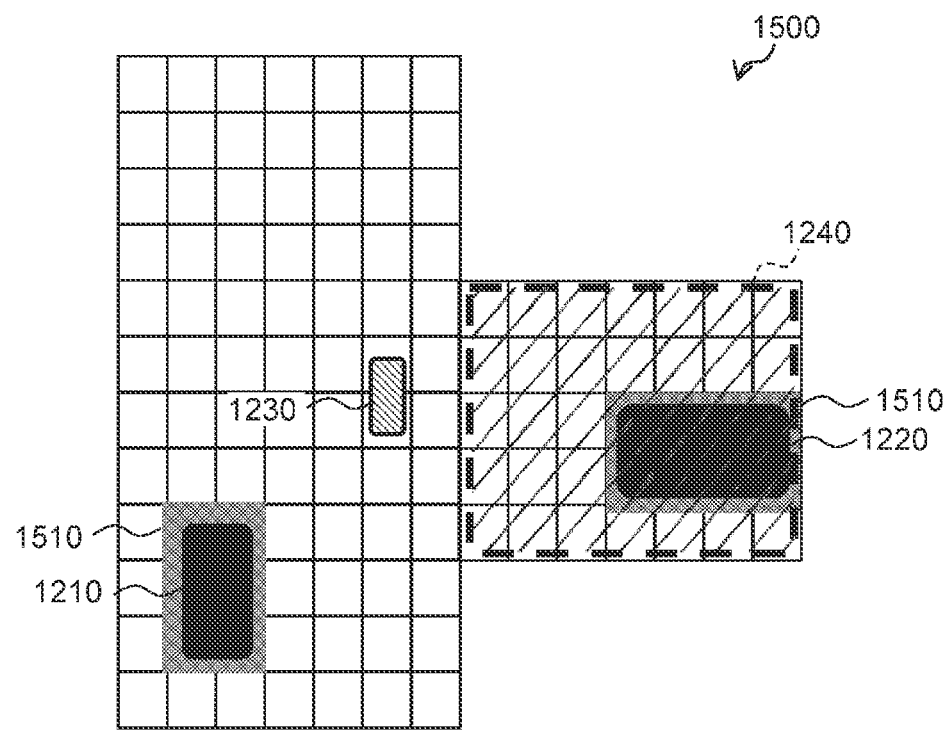

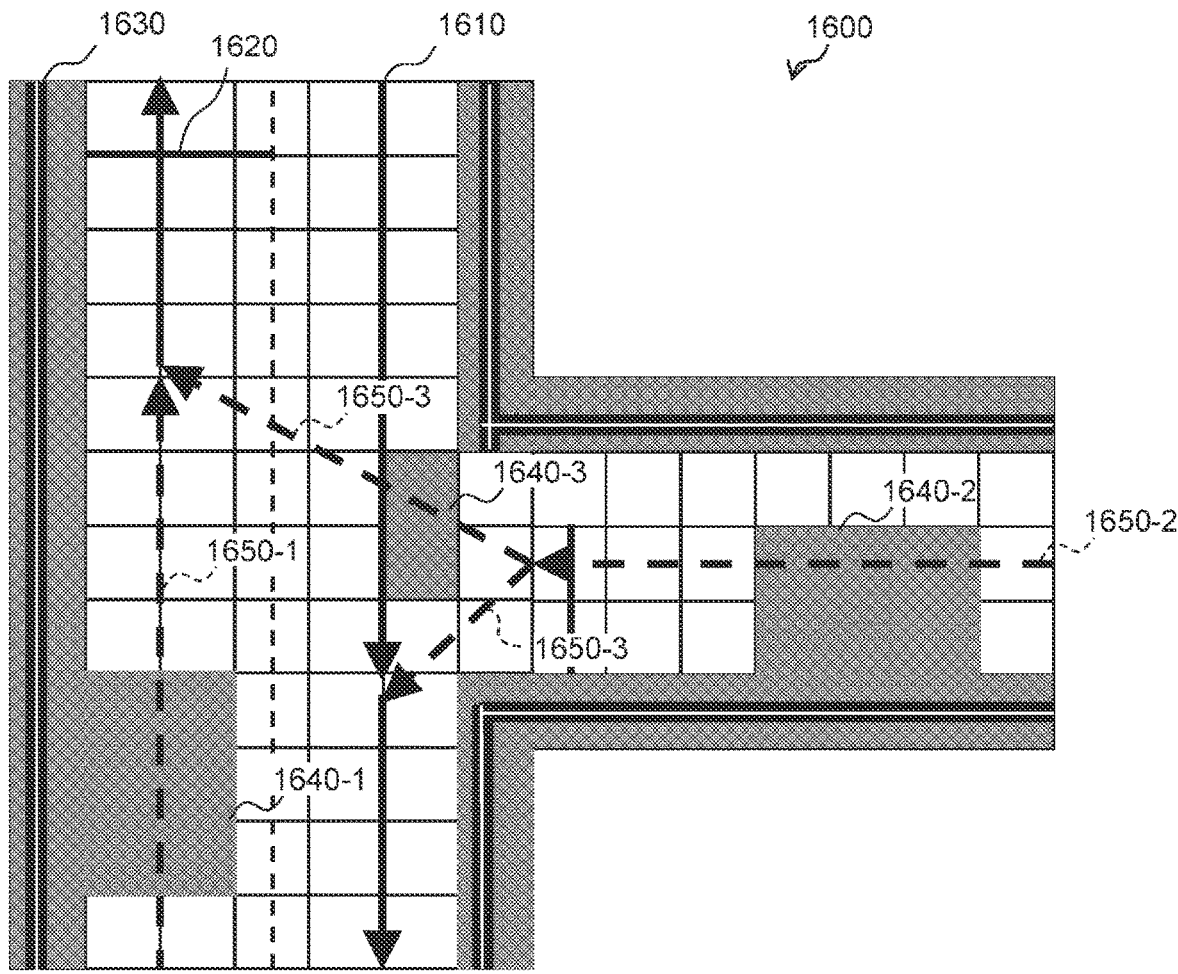
[FIG. 16]

INFORMATION MANAGEMENT SYSTEM, INFORMATION MANAGEMENT APPARATUS, AND INFORMATION MANAGEMENT METHOD

TECHNICAL FIELD

The present invention generally relates to management of information.

BACKGROUND ART

In recent years, autonomous driving vehicles have been put into practical use, and an operational design domain (ODD) corresponding to performance or the like of each autonomous driving vehicle has been defined for normal operation of an autonomous driving system. The ODD refers to conditions of a traveling environment and an operation method in design (hereinafter, referred to as "operational conditions"), which are prerequisites for the autonomous driving system to operate. The operational conditions of the ODD differ depending on each autonomous driving vehicle. Environment information is acquired in each autonomous driving vehicle, and it is determined whether the acquired environment information matches the operational conditions. When all the operational conditions are satisfied, the autonomous driving system operates normally.

However, in an advanced autonomous driving system having an autonomous driving level of "3" or higher, a technical level at which an autonomous driving vehicle can travel completely and safely under all road environments and weather conditions has not been reached.

Recently, an autonomous driving control system of a moving object that determines an inappropriate movement region more accurately and that generates a course of the moving object more accurately has been disclosed (see PTL 1).

CITATION LIST

Patent Literature

PTL 1: JP-A-2017-208040

SUMMARY OF INVENTION

Technical Problem

In the autonomous driving control system described in PTL 1, the own moving object searches for a route, but the moving object alone cannot see an obstacle outside a range of a sensor mounted on the moving object, and cannot obtain an optimal route.

Here, it is assumed that a server apparatus stores information of all stationary objects and properties of all roads, the server apparatus manages information such as operational conditions of the autonomous driving vehicle, standards of the autonomous driving vehicle, specifications of the autonomous driving vehicle, and performance of the autonomous driving vehicle (passage possibility information on possibility of passage on a road), and the server apparatus searches for a route. In this case, the server apparatus needs to manage all passage possibility information of the autonomous driving vehicle, and the management may become complicated.

The present invention has been made in view of the above points, and therefore intends to propose an information management system or the like that can appropriately manage passage possibility information.

Solution to Problem

In order to solve the above-described problems, the present invention provides: a first storage unit configured to store road information in which first information acquired by a first sensor and indicating that there is no stationary object on a road and second information acquired by a second sensor and indicating that there is a stationary object on the road are associated with each other; a second storage unit configured to store, for each of types of moving objects configured to move on the road, passage possibility information related to possibility of passage on the road; and a determination unit configured to determine, for each of the types, whether the road is usable for passage based on the road information and the passage possibility information.

In the above-described configuration, the road information common to types of all moving objects is stored regardless of the types of the moving objects, and the passage possibility information depending on a type of a moving object is stored for each of the types of the moving objects. According to the above-described configuration, for example, when it is determined whether each road for passage by each moving object, it is not necessary to manage the passage possibility information for each moving object, and management of the passage possibility information is facilitated.

Advantageous Effects of Invention

According to the present invention, passage possibility information can be appropriately managed.

BRIEF DESCRIPTION OF DRAWINGS

FIG. 1 is a diagram showing an example of a configuration of an information management system according to a first embodiment.

FIG. 2 is a diagram showing an example of a configuration of an information management apparatus according to the first embodiment.

FIG. 3 is a diagram showing an example of vehicle type-related information according to the first embodiment.

FIG. 4 is a diagram showing an example of lane information according to the first embodiment.

FIG. 5 is a diagram showing an example of static definition information according to the first embodiment.

FIG. 6 is a diagram showing an example of operational design information according to the first embodiment.

FIG. 7 is a diagram showing an example of unusable lane information according to the first embodiment.

FIG. 8 is a diagram showing an example of update processing according to the first embodiment.

FIG. 9 is a diagram showing an example of identification processing according to the first embodiment.

FIG. 10 is a diagram showing an example of conversion processing according to the first embodiment.

FIG. 11 is a diagram showing an example of generation processing according to the first embodiment.

FIG. 12 is a diagram showing an example of a grid map according to the first embodiment.

FIG. 13 is a diagram showing an example of capability object correspondence information according to the first embodiment.

FIG. 14 is a diagram showing an example of the grid map according to the first embodiment.

FIG. 15 is a diagram showing an example of the grid map according to the first embodiment.

FIG. 16 is a diagram showing an example of the grid map according to the first embodiment.

DESCRIPTION OF EMBODIMENTS (1) First Embodiment

Hereinafter, an embodiment of the present invention will be described in detail. In the present embodiment, management of passage possibility information of a moving object that moves on a predetermined road will be described. However, the present invention is not limited to the embodiments.

The predetermined road is a road in a site such as a factory or a mine (a road in a limited region), a general road, an expressway, or the like. Hereinafter, the road in the limited region will be described as an example of the predetermined road.

The moving object is a vehicle (for example, an autonomous driving vehicle), a robot, or the like in which autonomous driving is performed. Hereinafter, a vehicle will be described as an example of the moving object.

An information management apparatus according to the present embodiment processes information in three layers.

In a first layer, the information management apparatus stores and manages information that does not depend on a vehicle type, such as information on a stationary object and information on a free space.

The stationary object is a stationary object on a road that may obstruct passage of the vehicle. In a narrower sense, the stationary object refers to an object whose speed is "0" and an object that is not permanently stationary. The object that is not permanently stationary corresponds to an object that does not exist on a map of a road. The free space refers to a region on a road on which there is no stationary object.

The vehicle type is a type of the vehicle that has the same or similar structure, size, function, and the like. For example, in a case of classification according to a use, a normal automobile, a cargo car, a special automobile (a shovel loader, a forklift, a farm work automobile), and the like are exemplified. Further, for example, in a case of classification according to a type (body type), a sedan, a sport utility vehicle, a station wagon, and the like are exemplified. The vehicle type may be classified from other viewpoints such as a model year.

Here, the information management apparatus stores information depending on the vehicle type, such as operational conditions for each vehicle type and specifications for each vehicle type (vehicle standards, vehicle specifications, vehicle performance, and the like).

In a second layer, the information management apparatus determines, for each vehicle type, a road and an unusable road based on the information not depending on the vehicle type and the information depending on the vehicle type.

In a third layer, the information management apparatus searches for a route of the vehicle by using the determination result.

Next, an embodiment of the present invention will be described based on drawings. In the following description, the same elements are denoted by the same numbers in the drawings, and description thereof is omitted as appropriate. Further, when elements of the same type are described without being distinguished from each other, a common part (a part excluding branch numbers) of reference numerals including the branch numbers may be used, and when elements of the same type are described while being distinguished from each other, reference numerals including branch numbers may be used. For example, when impassable grids are described without being particularly distinguished from each other, the impassable grids may be described as "impassable grids 1640", and when the impassable grids are described while being distinguished from each other, the impassable grids may be described as "impassable grids 1640-1" and "impassable grids 1640-2".

In FIG. 1, a number 100 denotes an information management system according to a first embodiment as a whole.

(Configuration)

FIG. 1 is a diagram showing an example of a configuration of the information management system 100.

The information management system 100 includes an information management apparatus 110. The information management apparatus 110 is communicably connected to one or more vehicles 120 and one or more infrastructure sensors 130.

The information management apparatus 110 is a computer such as a notebook computer or a server apparatus. The information management apparatus 110 includes an update unit 111, an identification unit 112, a conversion unit 113, a generation unit 114, and a search unit 115. Further, the information management apparatus 110 manages grid information 116A, vehicle type-related information 116B, lane information 116C, static definition information 116D, operational design information 116E, and unusable information lane 116F.

The update unit 111 receives information indicating a free space detected by the vehicle 120 (hereinafter, referred to as "free space information") and free space information and information indicating a stationary object (hereinafter, referred to as "stationary object information") detected by the infrastructure sensor 130. The update unit 111 updates the grid information 116A based on the received free space information and the received stationary object information. The update unit 111 notifies the identification unit 112 of information indicating an updated grid (hereinafter, referred to as "updated grid information").

The grid information 116A is information of a map in which a part or all of a road in a site is defined by grids each having a predetermined size (for example, a grid-shaped region having a side of 10 cm to 30 cm) (hereinafter, referred to as "grid map"). A number is assigned to each grid, and each point (for example, coordinates (x, y)) on the road in the site can be specified by a grid number. The vehicle type-related information 116B, the lane information 116C, the static definition information 116D, the operational design information 116E, and the unusable lane information 116F will be described later by using FIGS. 3 to 7.

The identification unit 112 identifies a grid that is not passable (hereinafter, referred to as "impassable grid") for each vehicle type based on the updated grid information, the grid information 116A, and the vehicle type-related information 116B. The identification unit 112 notifies the conversion unit 113 of information on the impassable grid (hereinafter, referred to as "impassable grid information").

The conversion unit 113 converts the impassable grid information into information on an impassable lane (hereinafter, "impassable lane information") based on the lane information 116C such that the search unit 115 can search for a route using a lane (link). The conversion unit 113 notifies the generation unit 114 of the impassable lane information.

Based on the vehicle type-related information 116B, the static definition information 116D, and the operational design information 116E, the generation unit 114 identifies a lane that does not match an operational design and a lane in which passage is not permitted (hereinafter, referred to as "inappropriate lane"), and identifies the impassable lane and the inappropriate lane as unusable lanes (hereinafter, "unusable lanes") for each vehicle type. The generation unit 114 generates the unusable lane information 116F indicating the unusable lane. The generation unit 114 notifies the search unit 115 of information indicating that the unusable lane information 116 is generated.

The search unit 115 searches for a route such as when the vehicle 120 requests to go from here to there, or when there is an influence on an already searched route, or the like.

For example, the search unit 115 searches for a route based on information indicating a departure point (for example, a current point) and information indicating a destination point of the vehicle 120 transmitted from the vehicle 120, and the unusable lane information 116F. The search unit 115 calculates a route, by using map information in which a road is set as a lane and an intersection is set as a node, such that a total sum of costs such as a traveling time, a distance, and electric power consumption (for example, an electric power consumption amount) from the departure point to the destination point is minimum. A known technique such as a Dijkstra method or an A-star algorithm is used for an algorithm for searching for a route.

For example, when receiving information indicating that the unusable lane information 116 is generated by the generation unit 114, the search unit 115 confirms whether a search result including an updated route of a lane is in an auxiliary storage device 203. When the search result is in the auxiliary storage device 203, the search unit 115 re-searches for a route, and transmits a re-search result to the vehicle 120 to which the search result is transmitted.

The vehicle 120 is an autonomous driving vehicle in which autonomous driving is performed. The vehicle 120 includes an electronic control unit (ECU), a storage device, an internal sensor, an external sensor, a GPS reception unit, various actuators, a human machine interface (HMI), and the like. The external sensor is a detection device for detecting information on an outside or surroundings of the own vehicle 120. The external sensor includes at least one of a light detection and ranging (LiDAR), a radar, and a camera.

The vehicle 120 detects a traveling state (a speed, acceleration, a posture, and the like) of the own vehicle 120 by using, for example, the internal sensor. The vehicle 120 sequentially emits laser light toward an entire periphery of the own vehicle 120, measures information on an object based on reflected light, and calculates a distance to a free space or a stationary object (relative position), a shape of the stationary object, and the like by using, for example, the external sensor. Further, the vehicle 120 acquires an absolute position of the vehicle 120 based on, for example, GPS information received by the GPS reception unit. Further, the vehicle 120 generates free space information in which a range of the free space and an absolute position of the free space are associated with each other. The vehicle 120 transmits the free space information to the information management apparatus 110.

In the vehicle 120, information such as the departure point and the destination point are input via the HMI, and a request for searching for a route from the departure point to the destination point is transmitted to the information management apparatus 110. The route searched by the information management apparatus 110 is presented (display-output, voice-output, or the like) to a user via the HMI.

The infrastructure sensor 130 monitors whether there is a free space on a road, whether there is a stationary object on the road, and the like. The infrastructure sensor 130 is preferably installed such that a blind spot of the vehicle 120 can be compensated.

The infrastructure sensor 130 includes sensors such as a LiDAR and a camera. One or more infrastructure sensors 130 are installed on a road in a facility, and information on an installed position (absolute position) is stored.

For example, the infrastructure sensor 130 sequentially emits laser light toward an entire periphery of the own infrastructure sensor 130, measures information on an object based on reflected light, and calculates a distance to a free space or a stationary object (relative position), a shape of the stationary object, and the like. Further, the infrastructure sensor 130 generates the free space information in which a range of a free space and an absolute position of the free space are associated with each other, and the stationary object information in which a range of a stationary object and an absolute position of the stationary object are associated with each other. The vehicle 120 transmits the free space information and the stationary object information to the information management apparatus 110.

FIG. 2 is a diagram showing an example of a configuration of the information management apparatus 110. The information management apparatus 110 includes a processor 201, a main storage device 202, the auxiliary storage device 203, and a communication device 204.

The processor 201 is a device that performs arithmetic processing. The processor 201 is, for example, a central processing unit (CPU), a micro processing unit (MPU), a graphics processing unit (GPU), an artificial intelligence (AI) chip, or the like.

The main storage device 202 is a device that stores a program, data, and the like. The main storage device 202 is, for example, a read only memory (ROM), a random access memory (RAM), or the like. The ROM is a static random access memory (SRAM), a nonvolatile RAM (NVRAM), a mask read only memory (Mask ROM), a programmable ROM (PROM), or the like. The RAM is a dynamic random access memory (DRAM) or the like.

The auxiliary storage device 203 is a hard disk drive, a flash memory, a solid state drive (SSD), an optical storage device, or the like. The optical storage device is a compact disc (CD), a digital versatile disc (DVD), or the like. The program, data, and the like stored in the auxiliary storage device 203 are read into the main storage device 202 at any time.

The communication device 204 is a communication interface that communicates with another device via a communication medium. The communication device 204 is, for example, a wireless communication module, a network interface card (NIC), a universal serial interface (USB) module, a serial communication module, or the like. The communication device 204 can also function as an input device that receives information from communicably connected another device. Further, the communication device 204 can also function as an output device that transmits information to another device that are communicably connected with the communication device 204.

The information management apparatus 110 may include an input device, an output device, and the like. The input device is a user interface that receives information from the user. The input device is, for example, a keyboard, a mouse, a card reader, a touch panel, or the like. The output device is a user interface that outputs (display-outputs, voice-outputs, print-outputs, or the like) various types of information. The output device is, for example, a display device that visualizes various types of information, a voice output device (speaker), a printing device, or the like. The display device is a liquid crystal display (LCD), a graphic card, or the like.

The various functions provided in the information management apparatus 110 (the update unit 111, the identification unit 112, the conversion unit 113, the generation unit 114, the search unit 115, and the like) are implemented by the processor 201 reading and executing the program stored in the main storage device 202 or by a circuit that constitutes the information management apparatus 110 (the FPGA, the ASIC, the AI chip, or the like).

In addition to the above-described functions, the information management apparatus 110 may further include functions, for example, an operating system, a device driver, a file system, and a database management system (DBMS).

One function of the information management apparatus 110 may be divided into a plurality of functions, or a plurality of functions may be integrated into one function. Further, a part of the functions of the information management apparatus 110 may be provided as separate functions, or may be included in other functions. Further, a part of the functions of the information management apparatus 110 may be implemented by another computer that can communicate with the information management apparatus 110.

(Data)

Data managed by the information management apparatus 110 will be described using FIGS. 3 to 7. The data managed by the information management apparatus 110 is stored in the auxiliary storage device 203. However, a part of the data managed by the information management apparatus 110 may be stored in another computer that can communicate with the information management apparatus 110.

FIG. 3 is a diagram showing an example of the vehicle type-related information 116B (vehicle type-related table 300).

Information on specifications of each vehicle type is stored in the vehicle type-related table 300. More specifically, information (hereinafter, referred to as "vehicle type unique information") in which a vehicle type ID 301, a vehicle width 302, an autonomous driving level 303 (autonomous driving Lv), a type 304, a sensor 305, a function 306, a vehicle height 307, and a minimum ground clearance 308 are associated with one another is stored in the vehicle type-related table 300.

The vehicle type ID 301 is identification information that can identify a vehicle type. The vehicle width 302 is information indicating a width of the vehicle 120 when viewed from a front side with respect to a traveling direction of the vehicle 120 of the corresponding vehicle type. The autonomous driving level 303 is information indicating a technical level of autonomous driving of the vehicle type. The type 304 is information indicating a vehicle type. The sensor 305 is information indicating a sensor provided in the vehicle 120 of the corresponding vehicle type. The function 306 is information indicating a function provided in the vehicle 120 of the corresponding vehicle type. The vehicle height 307 is information indicating a height from a ground contact surface of a tire of the vehicle 120 of the corresponding vehicle type to an uppermost portion such as a roof. The minimum ground clearance 308 is information indicating a perpendicular distance from a horizontal road surface to a lowest place excluding wheels of the vehicle 120 of the corresponding vehicle type.

FIG. 4 is a diagram showing an example of the lane information 116C (lane table 400).

Information on a lane is stored in the lane table 400. More specifically, information in which a lane ID 401, start point coordinates 402, end point coordinates 403, and a complementary point sequence 404 are associated with one another is stored in the lane table 400.

The lane ID 401 is identification information that can identify a lane. The start point coordinates 402 are information indicating coordinates at a start point of the lane. The end point coordinates 403 are information indicating coordinates at an end point of the lane. The complementary point sequence 404 is information for indicating the lane as a curve or the like, and is information indicating coordinates of a point group for complementing the lane.

According to the lane table 400, the information management apparatus 110 can identify a lane of each grid. Although illustration is omitted, information such as a lane centerline, a width, and a partition line are included as high-precision map information in the lane information 116C.

FIG. 5 is a diagram showing an example of the static definition information 116D (static definition table 500).

Information indicating properties of a lane related to passage of the vehicle 120 is stored for each lane in the static definition table 500. More specifically, information in which a lane ID 501, an infrastructure sensor-corresponding road 502, a speed limit 503, unmanaged vehicle presence or absence 504, a required autonomous driving level 505, a passable time zone 506, and pedestrian presence or absence 507 are associated with one another (lane property information) is stored in the static definition table 500.

The lane ID 501 is identification information that can identify a lane. The infrastructure sensor-corresponding road 502 is information indicating whether the infrastructure sensor 130 is installed on a road of the lane. In a case of a lane monitored by the infrastructure sensor 130, "TRUE" is set in the infrastructure sensor-corresponding road 502. In contrast, in a case of a lane not monitored by the infrastructure sensor 130, "FALSE" is set in the infrastructure sensor-corresponding road 502. The speed limit 503 is information indicating a speed limit of the road of the lane.

The unmanaged vehicle presence or absence 504 is information indicating whether an unmanaged vehicle passes through the road of the lane. In a case of a lane through which the vehicle 120 managed by the information management apparatus 110 and a vehicle other than the vehicle 120 pass, "TRUE" is set in the unmanaged vehicle presence or absence 504. On the other hand, in a case of a lane through which only the vehicle 120 managed by the information management apparatus 110 passes, "FALSE" is set in the unmanaged vehicle presence or absence 504. The required autonomous driving level 505 is information indicating an autonomous driving level required for the vehicle 120 that passes through the road of the lane.

The passable time zone 506 is information indicating a time zone in which the vehicle 120 can pass through the road of the lane. The pedestrian presence or absence 507 is information indicating whether a pedestrian passes through the road of the lane. In a case of a lane through which the pedestrian passes, "TRUE" is set in the pedestrian presence or absence 507. On the other hand, in a case of a lane through which the pedestrian does not pass, "FALSE" is set in the pedestrian presence or absence 507.

FIG. 6 is a diagram showing an example of the operational design information 116E (operational design table 600).

Information indicating a traveling environment and operational conditions of an operation method is stored for each vehicle type in the operational design table 600. More specifically, information in which a vehicle type ID 601, an infrastructure sensor-corresponding road 602, an unmanaged vehicle-present road 603, and a pedestrian-present road 604 are associated with one another is stored in the operational design table 600.

The vehicle type ID 601 is identification information that can identify a vehicle type. The infrastructure sensor-corresponding road 602 is information indicating whether a road on which the vehicle 120 of the corresponding vehicle type travels needs to be a road on which the infrastructure sensor 130 is installed. The unmanaged vehicle-present road 603 is information indicating whether the unmanaged vehicle is allowed to travel on the road on which the vehicle 120 of the corresponding vehicle type travels. The pedestrian-present road 604 is information indicating whether the pedestrian is allowed to pass through the road on which the vehicle 120 of the corresponding vehicle type travels.

FIG. 7 is a diagram showing an example of the unusable lane information 116F (unusable lane table 700).

Information indicating an unusable lane is stored for each vehicle type in the unusable lane table 700. More specifically, information in which a vehicle type ID 701 and an unusable lane 702 are associated with each other is stored in the unusable lane table 700.

The vehicle type ID 701 is identification information that can identify a vehicle type. The unusable lane 702 is information indicating a lane of a road that cannot be used by the vehicle 120 of the corresponding vehicle type.

(Processing)

Processing of the information management system 100 will be described using FIGS. 8 to 11.

FIG. 8 is a diagram showing an example of processing (update processing) in the update unit 111. The update processing is started at an appropriate timing. The appropriate timing is a timing at which the free space information is changed to the stationary object information, a timing at which the stationary object information is changed to the free space information, a timing at which information is received from the vehicle 120, a timing at which information is received from the infrastructure sensor 130, a timing at which a time specified in advance reaches, a periodic timing, a timing instructed by the user, or the like.

S810: The update unit 111 maps updated information received from the vehicle 120 and the infrastructure sensor 130 (the free space information and the stationary object information) on the grid map as objects in the following processing. For example, based on position information of the information, the update unit 111 calculates which grid the object corresponds to, and maps the object on the grid map. The vehicle 120 and the infrastructure sensor 130 may determine whether the information has been updated, or the information management apparatus 110 may determine whether the information has been updated.

FIG. 12 shows an example of the grid map (grid map 1200) on which objects are mapped. Each grid shown in FIGS. 12 and 14 to 16 does not coincide with an actual scale for convenience of the drawings.

In the grid map 1200, an empty region is mapped based on the free space information collected by the infrastructure sensor 130. That is, when there is an object in a free space on the grid map 1200, the object is excluded. Further, based on the stationary object information, vehicle objects 1210 and 1220 indicating the stationary vehicles 120, a pothole object 1230 indicating a pothole, and a fog object 1240 indicating fog are mapped in the grid map 1200.

S820: The update unit 111 stores (holds) the updated grid information (for example, a grid number) in the main storage device 202.

In this way, in the update processing, the information acquired by the vehicle 120 and the infrastructure sensor 130 is reflected in the grid information 116A.

FIG. 9 is a diagram showing an example of processing in the identification unit 112 (identification processing). The identification processing is started when the update processing ends.

S910: The identification unit 112 acquires the grid map of the updated grid (grid information 116A) from the main storage device 202.

S920: The identification unit 112 acquires the vehicle type unique information from the vehicle type-related information 116B.

S930: The identification unit 112 calculates the impassable grid information for each vehicle type based on the grid map and the vehicle type unique information. More specifically, the identification unit 112 performs processing of S931 to S933.

S931: The identification unit 112 calculates, for each vehicle type, information on an object that can be handled (for example, capability object correspondence information indicating a relationship between a capability of the vehicle type and an object that can be handled by the vehicle type) based on the function of the vehicle type-related information.

FIG. 13 shows an example of the capability object correspondence information (capability object correspondence table 1300). According to the capability object correspondence table 1300, for example, when a function of "lane change" is included in the functions of the vehicle type in the vehicle type-related information, even if there is the "pothole object", a "falling object", or the like in the grid, the grid is determined to be passable. According to the capability object correspondence table 1300, for example, when a function of a "dense fog countermeasure" is included in the functions of the vehicle type in the vehicle type-related information, even if there is a "fog object" in the grid, the grid is determined to be passable.

According to the capability object correspondence table 1300, for example, when an "anti-lock brake system (ABS)" is included in the functions of the vehicle type in the vehicle type-related information, even if there is a "road surface frozen object" in the grid, the grid is determined to be passable. Further, according to the capability object correspondence table 1300, for example, when a "road clearance" is included in the functions of the vehicle type in the vehicle type-related information, even if there is a "step height object" in the grid, the grid is determined to be passable.

S932: The identification unit 112 determines whether an object in the updated grid is an object that can be handled by the vehicle 120 of each vehicle type.

S933: The identification unit 112 identifies, as an impassable grid, a grid determined to be impassable for each vehicle type.

In this way, in the identification processing, whether passage is possible is determined for each vehicle type for the updated grid.

FIGS. 14 and 15 show examples of the grid map associated with the impassable grid information.

FIG. 14 is a diagram showing an example of the grid map associated with the impassable grid information (the grid map 1400 for a vehicle type A).

Here, for the vehicle type A, it is assumed that nothing is calculated as an object that can be handled. In this case, grids 1410 in which the vehicle objects 1210 and 1220, the pothole object 1230, and the fog object 1240 are respectively mapped are identified as impassable grids.

FIG. 15 is a diagram showing an example of the grid map associated with the impassable grid information (a grid map 1500 for a vehicle type B).

Here, for the vehicle type B, it is assumed that the "pothole" and the "fog" are calculated as objects that can be handled. In this case, since the grids 1510 in which the vehicle objects 1210 and 1220 are respectively mapped are impassable, the grids 1510 are identified as the impassable grids.

FIG. 10 is a diagram showing an example of processing in the conversion unit 113 (conversion processing). The conversion processing is started when the identification processing ends.

S1010: The conversion unit 113 acquires high-precision map information (lane information 116C) of an impassable grid.

S1020: The conversion unit 113 acquires information including a lane centerline, a width, and a partition line from the high-precision map information.

S1030: The conversion unit 113 calculates an impassable lane based on the information including the lane centerline, the width, and the partition line. More specifically, the conversion unit 113 performs processing of S1031 to S1033.

S1031: The conversion unit 113 calculates, for each vehicle type, a passable lateral width of each lane of the impassable grid based on a lane centerline and a width of the lane.

S1032: The conversion unit 113 acquires a vehicle width of each vehicle type from the vehicle type-related information 116B.

S1033: For each lane of the impassable grid, the conversion unit 113 compares the passable lateral width with the vehicle width, and sets a lane having a smaller lateral width as the impassable lane.

FIG. 16 is a diagram showing an example of the grid map associated with the impassable lane information (grid map 1600).

In the grid map 1600, a lane centerline 1610, a width 1620, a partition line 1630, impassable grids 1640, and impassable lanes 1650 are shown.

Here, a vehicle type C which is not having the function of the lane change will be described as an example. In this case, since the function of "lane change" is not included in the functions of the vehicle type C, a lane corresponding to an impassable grid 1640-1 in which there is the vehicle object 1210 is set as an impassable lane 1650-1. Since a lane corresponding to an impassable grid 1640-2 in which there is the vehicle object 1220 is a lane having a smaller lateral width, the lane is set as an impassable lane 1650-2. Further, since a lane corresponding to an impassable grid 1640-3 in which there is the pothole object 1330 is a lane having a smaller lateral width and a function of "road clearance" is not included in the functions of the vehicle type C, the lane is set as an impassable lane 1650-3.

S1040: The conversion unit 113 assigns an impassable flag to the impassable lane.

In this way, in the conversion processing, the impassable grid is converted into the impassable lane.

FIG. 11 is a diagram showing an example of processing in the generation unit 114 (generation processing). The generation processing is started when the conversion processing ends, started at a time specified in advance, started periodically, or started when being instructed by the user.

S1110: Based on the vehicle type-related information 116B, the static definition information 116D, and the operational design information 116E, the generation unit 114 identifies an inappropriate lane (a lane that does not match the operational design and a lane in which passage is not permitted) for each vehicle type.

For example, for each record (each lane) of the static definition information 116D, the generation unit 114 identifies the inappropriate lane for each vehicle type.

More specifically, the generation unit 114 determines whether the lane of each record of the static definition information 116D satisfies operational conditions of each record of the operational design information 116E. The generation unit 114 identifies a lane determined not to satisfy any one of the operational conditions as the inappropriate lane.

For example, in a case where the infrastructure sensor-corresponding road 602 is "required", when the infrastructure sensor-corresponding road 502 is "FALSE", the generation unit 114 identifies the lane as a lane that does not match the operational design. Further, for example, in a case where the unmanaged vehicle-present road 603 is "not allowed", when the unmanaged vehicle presence or absence 504 is "TRUE", the generation unit 114 identifies the lane as a lane that does not match the operational design. Further, for example, in a case where the pedestrian-present road 604 is "not allowed", when the pedestrian presence or absence 507 is "TRUE", the generation unit 114 identifies the lane as a lane that does not match the operational design.

For example, in a case where the autonomous driving level in the vehicle type-related information 116B is "3", when the required autonomous driving level 505 is "4", the generation unit 114 identifies the lane as a lane in which passage is not permitted. Further, for example, when it is determined that a current time does not belong to "8:00 to 17:00" of the passable time zone 506, the generation unit 114 identifies the lane as a lane in which passage is not permitted.

In other words, for example, in a case where the speed limit is "20 km/h or less" in the static definition information 116D, when the speed limit 503 is "30", the generation unit 114 identifies the lane as a lane that does not match the operational design.

S1120: The generation unit 114 identifies the impassable lane and the inappropriate lane as the unusable lane, and stores the unusable lane information 116F indicating the unusable lane in the auxiliary storage device 203.

According to the present embodiment, it is possible to appropriately manage information used for searching for a route in an autonomous driving vehicle.

(2) Appendix

The above-described embodiment includes, for example, the following contents.

In the above-described embodiment, a case where the present invention is applied to the information management system has been described, but the present invention is not limited thereto, and can be widely applied to various other systems, apparatuses, methods, and programs.

In the above-described embodiment, the road in the site has been described, but the present invention is not limited thereto, and may be applied to a road (a general road, an expressway, and the like) outside the site.

In the above-described embodiment, a case where an impassable place is managed in a form of the grid has been described, but the present invention is not limited thereto, and the impassable place may be managed in a form of an absolute position, coordinates, or the like.

In the above-described embodiment, a case where the grid is managed in a form of the two-dimensional coordinates has been described, but the present invention is not limited thereto, and the grid may be managed in a form of three-dimensional coordinates.

In the above-described embodiment, the configuration of each table is an example. One table may be divided into two or more tables, or all or a part of the two or more tables may be one table.

In the above-described embodiment, the output of information is not limited to display on the display. The output of the information may be a voice output by a speaker, may be an output to a file, may be printing on a paper medium or the like by a printing device, may be projection on a screen or the like by a projector, or may be another mode.

In the above-described description, information such as a program, a table, and a file for implementing functions can be stored in a storage device such as a memory, a hard disk, or a solid state drive (SSD), or can be stored in a recording medium such as an IC card, an SD card, or a DVD.

The above-described embodiment has, for example, the following characteristic configuration.

An information management system (for example, the information management system 100) includes: a first storage unit (for example, the auxiliary storage device 203, or another computer different from the information management apparatus 110) configured to store road information (for example, the grid information 116A) in which first information (for example, the free space information) acquired by a first sensor (for example, the LiDAR, the camera, or the like provided in the vehicle 120, and the LiDAR, the camera, or the like provided in the infrastructure sensor 130) and indicating that there is no stationary object on a road, and second information (for example, the stationary object information) acquired by a second sensor (for example, the LiDAR, the camera, or the like provided in the infrastructure sensor 130) and indicating that there is a stationary object on the road are associated with each other; a second storage unit (for example, the auxiliary storage device 203, or another computer different from the information management apparatus 110) configured to store, for each of types (the vehicle type) of moving objects (for example, the vehicle 120) configured to move on the road, passage possibility information (for example, the vehicle type-related information 116B, and the operational design information 116E) related to possibility of passage on the road; and a determination unit (for example, the update unit 111, the identification unit 112, the conversion unit 113, the generation unit 114, the information management apparatus 110, and the circuit) configured to determine, for each of the types, whether the road can be used for passage based on the road information and the passage possibility information.

In the above-described configuration, the road information common to types of all moving objects is stored regardless of the types of the moving objects, and the passage possibility information depending on a type of a moving object is stored for each of the types of the moving objects. According to the above-described configuration, for example, when it is determined whether each moving object can use each road for passage, it is not necessary to manage the passage possibility information for each moving object, and management of the passage possibility information is facilitated.

When the first information is changed to the second information (at a timing at which the free space information is changed to the stationary object information), or when the second information is changed to the first information (at a timing at which the stationary object information is changed to the free space information) in the road information, the determination unit determines, for each of the types, whether the road can be used for passage based on the changed road information and the passage possibility information.

In the above-described configuration, since it is determined whether the road can be used for passage at the timing at which the road information is changed, a processing load can be reduced.

The road information is information including a plurality of grids. The passage possibility information includes unique information (for example, the vehicle type-related information 116B) indicating a specification unique to the type. The determination unit determines, for each of the types, whether a moving object of the type can pass through a grid corresponding to the second information based on the unique information (for example, see FIG. 9), and converts a grid determined to be impassable into a lane based on lane information (for example, the lane information 116C) that is used for searching for a route and identifying each of lanes corresponding to the grids (for example, see FIG. 10).

In the above-described configuration, since the grid determined to be impassable is converted into the lane used for searching for the route, for example, an existing route search can be used.

The passage possibility information includes, for each of the types, operational condition information (for example, the operational design information 116E) indicating an operational condition that is a prerequisite for autonomous driving. The determination unit determines, for each of the types, whether each of the lanes for which property information (for example, the lane property information of the static definition information 116D) indicating a property of the lane is defined is a lane satisfying the operational condition information based on the operational condition information and the property information, and identifies the converted lane and a lane not satisfying the operational condition information as unusable lanes (for example, see FIG. 11).

According to the above-described configuration, for example, it is possible to exclude a lane that does not match the operational conditions, and to exclude a lane that is not suitable for passage based on properties of the lane.

The information management system includes a search unit (for example, the search unit 115, the information management apparatus 110, the circuit, or another computer different from the information management apparatus 110) configured to search for a route by using the converted lane.

According to the above-described configuration, since an unusable lane is identified in consideration of a stationary object that is outside a sensor range and that cannot be detected by the moving object alone, it is possible to search for an optimal route.

The above-described configuration may be changed, rearranged, combined, or omitted as appropriate without departing from the scope of the present invention.

It should be understood that items included in a list in a form of "at least one of A, B, and C" can mean (A), (B), (C), (A and B), (A and C), (B and C), or (A, B, and C). Similarly, items listed in a form of "at least one of A, B, and C" can mean (A), (B), (C), (A and B), (A and C), (B and C), or (A, B, and C).

REFERENCE SIGNS LIST 100 information management system

The invention claimed is:

1. An information management system comprising:
a first storage unit configured to store road information in which first information acquired by a first sensor and indicating that there is no stationary object on a road and second information acquired by a second sensor and indicating that there is a stationary object on the road are associated with each other;
a second storage unit configured to store, for each type of moving objects configured to move on the road, passage possibility information related to possibility of passage on the road; and
a determination unit configured to determine, for each of the types of moving objects, whether the road is usable for passage based on the road information and the passage possibility information,
wherein the road information is information including a plurality of grids,
wherein the passage possibility information includes unique information indicating a specification unique to each of the types,
wherein the unique information includes information relating to one or more countermeasure functions each of which enables traffic to deal with a stationary object on the road according to each of the types of stationary objects, even if there is a stationary object on a road,
wherein the determination unit executes:
first processing which is to determine, for each of the types of moving objects, whether a moving body of each of the types passes through a grid corresponding to the second information based on the unique information, and
second processing which is to convert a grid determined to be impassable in the first processing into a lane based on lane information that is used for searching for a route and identifying each of lanes corresponding to the grids, and
wherein in the first processing, when the unique information indicates that a certain type of moving body has the countermeasure function corresponding to each of the types of stationary object in the grid to be determined, the determination unit determines that each of the types of moving body can pass through the grid.

2. The information management system according to claim 1,
wherein when the first information is changed to the second information or when the second information is changed to the first information in the road information, the determination unit executes third processing which is to determine, for each of the types of moving objects, whether the road is usable for passage based on the changed road information and the passage possibility information.

3. The information management system according to claim 1,
wherein the passage possibility information includes, for each of the types, operational condition information indicating an operational condition that is a prerequisite for autonomous driving, and
wherein the determination unit executes forth processing which is to determine, for each of the types of moving objects, whether each of the lanes for which property information indicating a property of the lane is defined is a lane satisfying the operational condition information based on the operational condition information and the property information, and which is to identify the lane converted in the second processing and a lane not satisfying the operational condition information as unusable lanes.

4. The information management system according to claim 1, further comprising:
a search unit configured to search for a route by using the lane converted in the second processing.

5. An information management apparatus comprising:
a first storage unit configured to store road information in which first information acquired by a first sensor and indicating that there is no stationary object on a road and second information acquired by a second sensor and indicating that there is a stationary object on the road are associated with each other;
a second storage unit configured to store, for each type of moving objects configured to move on the road, passage possibility information related to possibility of passage on the road; and
a determination unit configured to determine, for each of the types of moving objects whether the road is usable for passage based on the road information and the passage possibility information,
wherein the road information is information including a plurality of grids,
wherein the passage possibility information includes unique information indicating a specification unique to each of the types,
wherein the unique information includes information relating to one or more countermeasure functions each of which enables traffic to deal with a stationary object on the road according to each of the types of stationary objects, even if there is a stationary object on a road,
wherein the determination unit executes:
first processing which is to determine, for each of the types of moving objects, whether a moving body of each of the types passes through a grid corresponding to the second information based on the unique information, and
second processing which is to convert a grid determined to be impassable in the first processing into a lane based on lane information that is used for searching for a route and identifying each of lanes corresponding to the grids, and
in the first processing, when the unique information indicates that a certain type of moving body has the countermeasure function corresponding to each of the types of stationary object in the grid to be determined, the determination unit determines that each of the types of moving body can pass through the grid.

6. An information management method used in an information management system including:
a first storage unit configured to store road information in which first information acquired by a first sensor and indicating that there is no stationary object on a road and second information acquired by a second sensor and indicating that there is a stationary object on the road are associated with each other, a second storage unit configured to store, for each of types of moving objects configured to move on the road, passage possibility information related to possibility of passage on the road, and a determination unit configured to determine, for each of the types, whether the road is usable for passage based on the road information read from the first storage unit and the passage possibility information read from the second storage unit, wherein the road information is information including a plurality of grids, wherein the passage possibility information includes unique information indicating a specification unique to each of the types, wherein the unique information includes information relating to one or more countermeasure functions each of which enables traffic to deal with a stationary object on the road according to each of the types of stationary objects, even if there is a stationary object on a road, the information management method comprising:

executing, by the determination unit, first processing which is to determine, for each of the types, whether a moving body of each of the types passes through a grid corresponding to the second information based on the unique information; and executing, by the determination unit, second processing which is to convert a grid determined to be impassable in the first processing into a lane based on lane information that is used for searching for a route and identifying each of lanes corresponding to the grids, and wherein in the first processing, when the unique information indicates that a certain type of moving body has the countermeasure function corresponding to each gf the types of stationary object in the grid to be determined, the determination unit determines that the type of moving body can pass through the grid.

\* \* \* \* \*